(12) United States Patent
Fahldieck

(10) Patent No.: US 8,662,553 B2
(45) Date of Patent: Mar. 4, 2014

(54) SUCTION GRIPPER FOR PET BOTTLES

(75) Inventor: Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 13/264,900

(22) PCT Filed: May 21, 2010

(86) PCT No.: PCT/EP2010/003148
§ 371 (c)(1),
(2), (4) Date: Oct. 17, 2011

(87) PCT Pub. No.: WO2011/000450
PCT Pub. Date: Jan. 6, 2011

(65) Prior Publication Data
US 2012/0034063 A1    Feb. 9, 2012

(30) Foreign Application Priority Data
Jul. 1, 2009   (DE) .......................... 10 2009 031 435

(51) Int. Cl.
*B65G 47/86*   (2006.01)
(52) U.S. Cl.
USPC .................. 294/183; 294/185; 198/803.5
(58) Field of Classification Search
USPC .................. 294/183–189; 198/867.03, 803.5
See application file for complete search history.

(56) References Cited

U.S. PATENT DOCUMENTS

| | | | |
|---|---|---|---|
| 3,770,098 A | 11/1973 | Baugnies | |
| 4,093,081 A | 6/1978 | Yver | |
| 5,308,237 A * | 5/1994 | Kieran | 425/437 |
| 5,363,866 A * | 11/1994 | Egger | 134/45 |
| 6,386,609 B1 | 5/2002 | Govzman | |
| 6,692,050 B2 * | 2/2004 | Graffin | 294/104 |
| 7,335,387 B2 * | 2/2008 | Hayes et al. | 426/433 |
| 7,784,603 B2 | 8/2010 | Burgmeier | |
| 2006/0182604 A1 | 8/2006 | Clark | |
| 2008/0272609 A1 | 11/2008 | Knieling et al. | |
| 2009/0014615 A1 * | 1/2009 | Hausladen | 248/311.2 |
| 2011/0089003 A1 * | 4/2011 | Fahldieck | 198/803.1 |
| 2011/0180374 A1 * | 7/2011 | Fahldieck | 198/617 |

FOREIGN PATENT DOCUMENTS

| | | |
|---|---|---|
| DE | 2657992 | 9/1977 |
| DE | 2729747 | 1/1979 |
| DE | 2706765 | 3/1986 |
| DE | 19549454 | 8/1997 |
| DE | 19830456 | 6/1999 |
| DE | 19808058 | 9/1999 |
| DE | 202005002924 | 3/2006 |
| DE | 102005002715 | 8/2006 |
| DE | 102005014838 | 10/2006 |
| DE | 102005041929 | 3/2007 |
| DE | 102007037228 | 2/2009 |
| EP | 0939044 | 9/1999 |
| EP | 1283171 | 2/2003 |
| EP | 1868746 | 12/2007 |
| SU | 1007968 | 3/1983 |
| WO | 97/16346 | 5/1997 |
| WO | WO 2010003551 A1 * 1/2010 | ............... B25J 15/12 |

* cited by examiner

*Primary Examiner* — Saul Rodriguez
*Assistant Examiner* — Gabriela Puig
(74) *Attorney, Agent, or Firm* — Occhiuti & Rohlicek LLP

(57) ABSTRACT

An apparatus for handling and transporting containers includes a gripper element for holding or gripping a container having a body region, a closable mouth opening on a top thereof, and a neck region therebetween, with the gripper element being configured as a suction gripper.

17 Claims, 3 Drawing Sheets

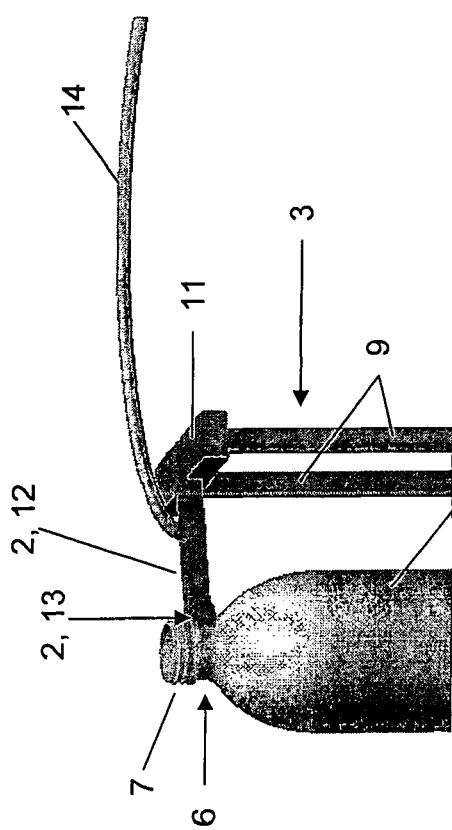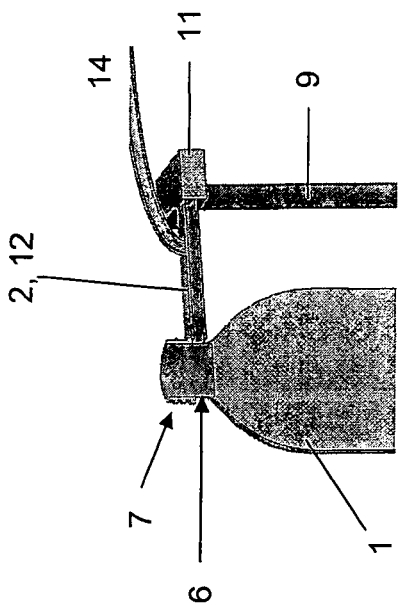

SUCTION GRIPPER FOR PET BOTTLES

CROSS REFERENCE TO RELATED APPLICATIONS

This application is the National Stage of International Application No. PCT/EP2010/003148, filed on May 21, 2010, which claims the benefit of the priority date of German Patent Application No. 10 2009 031 435.0, filed on Jul. 1, 2009. The contents of both applications are hereby incorporated by reference in their entirety.

FIELD OF DISCLOSURE

The invention relates to a handling and transporting machine for containers which has at least one gripping element for holding or gripping the container, wherein the container has a body region, at the top a closable mouth opening and a neck region.

BACKGROUND

Such containers can for example be used as bottles for liquids, for example drinks. The containers, for example bottles, can be made of a transparent or translucent material, for example glass or preferably a translucent plastic, for example PET. It is however also conceivable for the containers to be made of other materials and able to be filled with other fillings.

The handling and transporting machine serves to supply the containers, for example PET bottles in the drinks industry, to a container handling plant for example a drinks filling plant, a labelling plant or also an inspection device, wherein the handling and transporting machine can also be designed as one of said devices or also as a supply star. The containers are held in their top region, in the case of PET bottles on a peripheral collar, and gripped below the bottle opening, i.e. in the neck region, by gripper elements.

Such gripper elements are e.g. known as mechanically acting gripper clamps, wherein the gripping force can be generated mechanically or also by means of magnets.

DE 10 2005 014 838 A1 concerns a clamp for holding vessels, in particular bottles, in vessel transporting and handling machines, with at least two clamping arms which are mobile in relation to each other for opening and closing, wherein each clamping arm has a gripper arm and at least one clamping arm has a counter arm. The clamping arm comprising the gripper arm and counter arm is formed as one piece, wherein the gripper arm is designed form-stable and the gripper arm form-elastic. Thus a clamp is provided for holding vessels which allows the necessary centring of the vessels, wherein at the same time vessel diameter tolerances can be compensated.

DE 10 2005 041 929 A1 also concerns a gripper for containers, in particular for bottles in container transporting systems or container handling machines, with at least two gripper arms mobile in relation to each other which are moved in the gripping direction by magnetically cooperating permanent magnets. These permanent magnets which simultaneously repel and attract each other are formed and arranged mobile to each other due to the working movement of the gripper such that in the gripping direction, the sum of the repulsion and attraction forces acting on the gripper arms remains substantially constant within a predetermined gripping range covering various container gripping sizes.

An apparatus for gripping containers and in particular bottles with a carrier, a first gripper device arranged on the carrier with a first gripper element mobile in the direction of a peripheral edge of the container in order to grip the container on its outer periphery, is disclosed in DE 10 2007 037 228 A1. The apparatus has a second gripper device arranged on the carrier which can be introduced at least in portions into a mouth piece of the container, wherein the second gripper device has a second gripper element which is mobile in the direction of an inner periphery of the container to grip the container from the inside. With such a device in particular bottles with clip-lock closures can be gripped. Depending on the position of the clip-lock closure, either the first gripper element or the second gripper element engages.

DE 198 08 058 A1 discloses a bottle gripper or a gripper device for bottles with two gripper arms which can be moved into a holding or releasing position via a control cam, in that the control cam cooperates with a contact surface formed on each gripper arm. The contact surface is part of an elastic cushion which is arranged on the respective gripper arm.

DE 198 30 456 B4 discloses a gripper device for bottles which has proved successful in practice with two gripper arms which are swivelable relative to each other by means of a drive device between a gripping position holding the bottles and a spread position releasing the bottles, wherein the drive device at a drive part acting on the gripper arms applies a predetermined constant adjustment travel. The gripper arms are advantageously coupled with the drive part, interposing at least one elastically deformable buffer element, wherein the drive part engages in a recess of a gripper arm leaving an interposed gap and wherein the buffer element at least partly fills this gap.

German utility model DE 20 2005 002 924 U1 also discloses a clamp gripper for a vessel transport system, in particular for a bottle transport system with two gripper arms, wherein here too a force accumulator is provided with at least one pair of mutually repelling permanent magnets.

According to the figures of SU 1007968 A, this also concerns a magnetically acting gripper system wherein a magnet with matching polarity is introduced into another magnet so that here a gripper area is activated because of the magnetic repulsion.

U.S. Pat. No. 6,386,609 B1 also concerns a gripper device where here too magnets are provided. However this gripper device does not grip containers but washers. DE 26 57 992 discloses a gripper device which is arranged on calibration presses.

Known containers in particular PET bottles have an external thread about their mouth region on which a screw cap for example can be screwed. Rebound closures are also conceivable. In order to indicate to the consumer that the PET bottle has been adequately sealed i.e. not yet opened before first use, the PET bottles or the screw closures have so-called first opening guarantees. If the first opening guarantee is intact, the consumer can assume that the container or its closure has not yet been opened, that the container is completely filled and that the contents are uncontaminated.

The first opening guarantee of a screw cap or the guarantee strip engages in a lock groove arranged below the screw thread.

It is to be expected that in future, more PET bottles will be used without a lock groove because this can save weight and hence substantial material costs. The purpose of the lock groove must then be fulfilled by a ring flange known as a neck ring, where the guarantee strip, i.e. the first opening guarantee, protrudes over the neck ring in such a design.

The neck ring can for example serve to move the bottles on suitable suspension devices in the sales area, wherein the main function of the neck ring can be regarded as serving for transport in handling and/or transporting machines for containers. If now for weight saving reasons and hence cost saving reasons the neck ring is omitted so that bottles without neck rings are present, the existing lock groove would have to assume the function of the neck ring.

If PET bottles are designed for example without lock groove or for example without neck ring, for bottle handling only a plane is available on which the gripper elements can hold the bottles.

SUMMARY

The object of the invention is therefore to improve a handling and transporting machine for containers, in particular its gripper elements, with simple means such that bottles or containers without neck ring or containers without lock groove can be transported safely even in a rotational motion.

According to the invention the object is achieved by a handling and transporting machine with the features of claim 1, wherein the gripper element is designed as a suction gripper.

Suitably the gripper element grips the neck region below the mouth opening of the container.

Advantageously it is provided that the gripper element has a web region which transforms into a gripper region, wherein preferably it is provided that the gripper region is designed flexibly adaptable to the respective neck region of the container or PET bottle. The suction gripper can be used in particular for bottles but also for PET-KEG, sachet packages with spouts and similar, if the pouring neck or spout neck has a suitable neck surface as a contact surface for the sucker element.

The gripper element in its advantageous embodiment as a suction gripper is connected with a medium source so that in the gripper region a vacuum can be generated. By means of the vacuum the neck region of the container or the PET bottle can be drawn over the gripper region so that the suction force generated by the vacuum ensures a secure grip on the container.

As the handling and transporting machine has not just one gripper element but several gripper elements, in the sense of the invention it is favourable if each gripper element is arranged on a holder device also running in the transport direction. The holder device has at least one foot rod which is connected on the top with a top web, wherein the gripper element is arranged via its web region on the top web. The foot rod is provided with a flange at the base which can be connected with the handling and/or transporting machine so that continuous transport of the containers is ensured even in the rotational direction of the machine.

In a particularly preferred embodiment, the handling and transporting machine is produced in a rotating design, which means that the handling and/or transporting machine is designed in this embodiment as a star machine. This rotates about a central rotary axis, the containers being held on the outer periphery by means of the gripper elements. Suitable handling and/or transporting machines can for example be filling machines, container handling machines and/or transport stars, also so-called rinsers, fillers, stars and where applicable also closing machines, wherein naturally also inspection plants can be designed accordingly.

It is advantageous for the gripper element or suction gripper simultaneously to support the container or bottle in the gripper region i.e. in the neck region. This is possible as the web area is designed rigid, wherein the gripper area can be designed for example articulated or flexible in order to adapt to different diameters of the preferably cylindrically designed neck region so that different bottle sizes or container sizes can also be transported with the handling or transporting machine. Naturally the neck region can also be produced in other suitable geometric designs.

DESCRIPTION OF THE FIGURES

Further advantageous embodiments of the invention are disclosed in the subclaims and/or the following description of the figures. These show:

DETAILED DESCRIPTION

Figure 1:
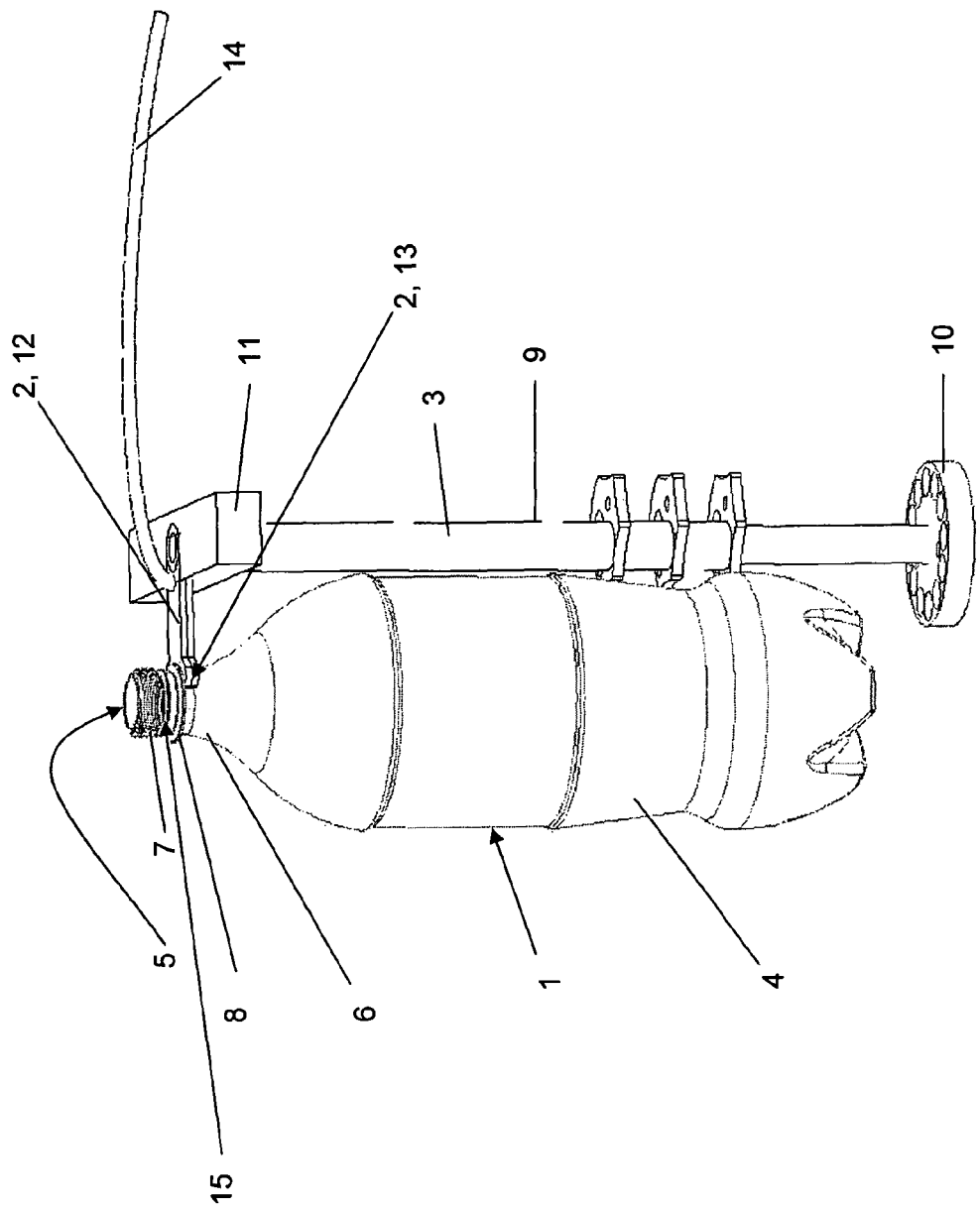
FIG. 1 a principle view of a gripper element which is arranged on a holder device, the gripper element gripping a container in a first embodiment, FIG. 2 a side view of a container in a further embodiment, FIG. 3 the gripper element from FIG. 1 which grips a container according to FIG. 2, and FIG. 4 a section view from FIG. 3.

In the different figures, the same parts always carry the same reference numerals, so usually these are only described once.

FIG. 1 shows a section of a handling and transporting machine not shown in more detail which in a rotating design transports containers 1 or bottles e.g. to a handling machine also not shown, for example a filler, rinser, star and where applicable closing device and/or labelling device. To hold the container 1 gripper elements 2 are provided which are arranged on a holder device 3.

The container 1 has a body area 4, at the top a closable mouth opening 5 and a neck region 6. The mouth opening 5 has an external thread 7 to receive a screw closure. Below the external thread 7 is arranged a ring flange 8, a so-called neck ring 8. In the embodiment shown the container 1 is a PET bottle.

The holder device 3 in the embodiment shown in FIG. 1 as an example has a foot rod 9 which on the base has a fixing flange 10 and on the top a top web 11. The top web 11 can also be called a transverse web 11.

The gripper element 2 has a web region 12 and a gripper region 13. The web region 12 is connected on one side with the top web 11, and opposite this with the gripper region 13.

A connecting line 14 to a medium source opens into the web region 12. The medium source can for example be a compressed air source. The web region 12 in the preferred embodiment is designed as a rigid hollow profile. By means of the connecting line 14 or the medium introduced, at the gripper region 13 in relation to the inlet point of the connecting line 14 in the web region 12, a vacuum or reduced pressure is generated which creates a suction force at the gripper region 13 or at its contact surface, so that the gripper element 2 is designed as suction gripper. For this the gripper region 12 can have sealing lips spaced with a gap or corresponding suction openings on a flexible contact element, to name just a few possibilities for holding by suction the neck region 12 and hence the container 1.

The gripper region 13 grips the neck region 6 of the container 1, in the plane of the drawing below the ring flange 8. Because of the vacuum or suction force generated, the container 1 is not only held securely in the transport direction but at the same time supported by the gripper element 2.

In a further preferred embodiment the gripper region 13 is designed flexibly adaptable to different diameters of the neck region 6. As shown, the gripper region 13 surrounds less than half the periphery of the neck region 6, preferably around 25% of the periphery. To this extent the gripper region is designed in the manner of a quasi-circle segment which on its active surface i.e. at the contact surface pointing towards the neck region 6 (bottle neck) has corresponding devices for holding by suction, as stated above. Naturally the said amounts of grip are merely examples, which means that the grip region can also be more than 50% of the periphery of the neck region 6 or can surround this completely.

Also the invention comprises a method for holding and transport of containers (1), in particular bottles, KEG, sachet packs with pourer and similar in which a variant of the said handling and transporting machine is used. Advantageously the containers (1) are transported with their mouths at the top. The vertical alignment is also retained when containers are transferred from one handling and transporting machine to the next.

In individual cases, for example for a rinsing step, it is necessary for the containers (1) to be swivelled through 180° and transported at least along a part section aligned with the mouth opening pointing downward.

In the embodiment example shown in FIG. 1 a lock groove 15 is arranged below the external thread 7 and above the ring flange 8.

Figure 2:
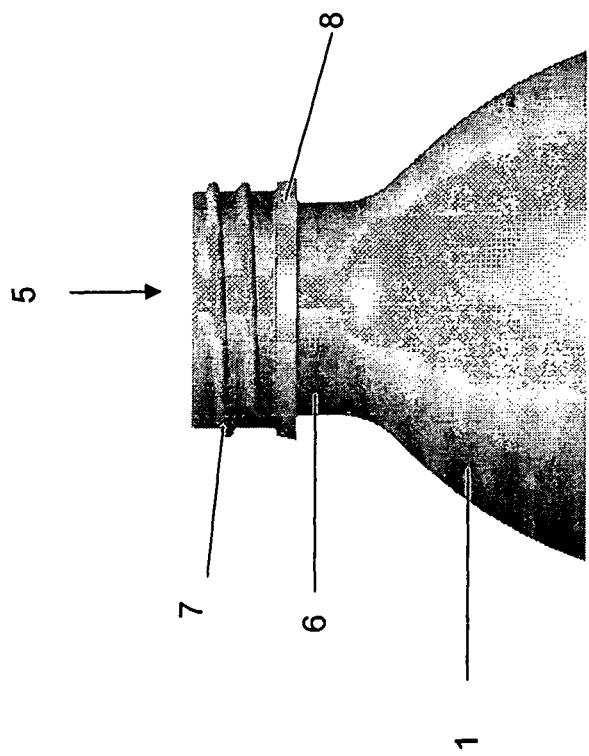

A further embodiment of the container 1 is shown in FIG. 2. In this embodiment example the ring flange 8 is directly next to the external thread 7. In this embodiment example there is no lock groove. However the container 1 has a neck region 6 on which the gripper element 2 can grip with its gripper region 13, as shown for example in FIG. 3.

Also in the embodiment in FIG. 3, in contrast to the embodiment in FIG. 1, the holding device 3 is designed with two parallel foot rods 9 which on the top are connected with the top web 11. The connection of the foot rods 9 to the rotating transport or container handling machine is not shown.

FIG. 4 shows a section view through FIG. 3. In FIG. 4 it is clear that the web region 12 is formed as a square hollow rod or hollow profile viewed in cross section, wherein naturally other profile designs are conceivable. The gripper region is not evident in FIG. 4 because of the section view selected. It is however evident that the gripper element 2 lies on the cylindrically designed neck region 6, where it is essential that the neck region 6 or the container 1 is held by suction on or is drawn towards the gripper element 2.

REFERENCE NUMERAL LIST

1 Container
2 Gripper element
3 Holding device
4 Body region
5 Mouth opening
6 Neck region
7 External thread
8 Ring flange
9 Foot rod
10 Fixing flange
11 Top web
12 Web region
13 Gripper region
14 Connecting line
15 Lock groove

The invention claimed is:

1. An apparatus for handling and transporting containers, said apparatus comprising a plurality of gripper elements disposed on a periphery of a rotating star machine, each of said gripper elements for holding or gripping a container having a body region, a closable mouth opening on a top thereof, a neck region therebetween, and a container axis extending vertically through said neck region, said neck region having a circumference, said gripper element being connected to a medium source, arranged on a holding device, and configured as a suction gripper configured to grip said circumference of said neck of said container with said container oriented while said container axis is oriented in a direction parallel to the Earth's gravitational field at the location of said container, wherein the set of all points at which said gripper contacts said circumference of said neck defines a connected region such that given any first point and any second point in said connected region, there exists a path connecting said first point and said second point that lies entirely within said connected region.

2. The apparatus of claim 1, wherein the gripper element comprises a web region and a gripper region.

3. The apparatus of claim 2, wherein the gripper region is configured to flexibly adapt to the neck.

4. The apparatus of claim 1, wherein said gripper element is adapted to hold or grip a bottle.

5. The apparatus of claim 1, wherein said gripper element is adapted to hold or grip a sachet pack with pourer.

6. The apparatus of claim 1, wherein said gripper element is adapted to hold or grip a KEG.

7. The apparatus of claim 1, wherein the suction gripper is configured to surround a portion of the neck.

8. The apparatus of claim 1, wherein the gripper elements are disposed to transfer bottles.

9. The apparatus of claim 1, wherein said gripper element comprises a gripper region, a top web, and a web region that extends horizontally between said top web and said gripper region.

10. The apparatus of claim 1, wherein said holding device comprises a fixing flange, a top web, and a foot rod extending vertically therebetween, and where said gripper element comprises a web region that extends horizontally from said top web, and a gripper element mounted at a distal end of said web region.

11. A method for holding and transporting containers having a body region, a closable mouth opening on a top thereof, and a neck region therebetween, said method comprising holding and transporting said containers by gripping or holding a container at a neck thereof with a gripper element in a vertical orientation, said vertical orientation being in a direction parallel to the Earth's gravitational field at a location of said container, said gripper element being one of a plurality of gripper elements disposed on a periphery of a rotating star machine, each of said gripper elements being connected to a medium source, arranged on a holding device, and configured as a suction gripper, wherein the set of all points at which said circumference of said neck is gripped defines a connected region such that given any first point and any second point in said connected region, there exists a path connecting said first point and said second point that lies entirely within said connected region.

12. The method of claim 11, further comprising transporting the containers from one transporting machine to the next with their openings aligned at the tops thereof.

13. The method of claim 11, further comprising swiveling the containers 180 degrees so that the containers are aligned with their mouth openings pointing downward.

14. The method of claim 11, wherein gripping or holding said containers with a gripper element configured as a suction gripper comprises gripping or holding bottles.

15. The method of claim 11, wherein gripping or holding said containers with a gripper element configured as a suction gripper comprises gripping or holding sachet packs with pourers.

16. The method of claim 11, wherein gripping or holding said containers with a gripper element configured as a suction gripper comprises gripping or holding KEGs.

17. An apparatus for handling and transporting containers, said apparatus comprising a plurality of gripper elements disposed on a periphery of a rotating star machine, each of said gripper elements for holding or gripping a container having a container axis oriented in a direction parallel to the Earth's gravitational field, a body region, a closable mouth opening on a top thereof, and a neck region therebetween, said gripper element being connected to a medium source, arranged on a holding device, and comprising means for causing a suction force on a circumference of a neck of said container, wherein the set of all points at which said gripper contacts said circumference of said neck defines a connected region such that given any first point and any second point in said connected region, there exists a path connecting said first point and said second point that lies entirely within said connected region.

* * * * *